(12) United States Patent
Kohara et al.

(10) Patent No.: US 7,036,868 B2
(45) Date of Patent: May 2, 2006

(54) AUTOMOBILE DOOR STRUCTURE WITH WATER AND NOISE ISOLATION SHEET

(75) Inventors: Yoshihiro Kohara, Hiroshima-ken (JP); Shinichiro Emori, Hiroshima-ken (JP); Masami Isobe, Hiroshima-ken (JP)

(73) Assignees: Nishikawa Rubber Co., Ltd., Hiroshima (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/895,539

(22) Filed: Jul. 21, 2004

(65) Prior Publication Data
US 2005/0052051 A1 Mar. 10, 2005

(30) Foreign Application Priority Data
Sep. 10, 2003 (JP) ............................. 2003-317894

(51) Int. Cl.
*B60R 13/01* (2006.01)

(52) U.S. Cl. .................... 296/146.7; 296/39.1

(58) Field of Classification Search ............ 296/146.7, 296/39.1, 39.3
See application file for complete search history.

(56) References Cited

U.S. PATENT DOCUMENTS

| | | | | |
|---|---|---|---|---|
| 5,322,722 A * | 6/1994 | Rozenberg | ................. | 296/39.1 |
| 5,456,513 A * | 10/1995 | Schmidt | ................. | 296/146.7 |
| 5,482,343 A * | 1/1996 | Bradac | ................... | 296/146.7 |
| 5,688,015 A * | 11/1997 | Patterson et al. | .......... | 296/39.1 |
| 6,197,403 B1 * | 3/2001 | Brown et al. | .............. | 296/39.1 |
| 6,226,927 B1 * | 5/2001 | Bertolini et al. | ............. | 49/502 |
| 6,393,767 B1 * | 5/2002 | Fukumoto et al. | ............ | 49/503 |
| 6,412,852 B1 * | 7/2002 | Koa et al. | ................. | 296/146.7 |
| 6,428,081 B1 * | 8/2002 | Williams et al. | .......... | 296/146.7 |
| 6,619,724 B1 * | 9/2003 | Blomeling et al. | ....... | 296/146.7 |
| 6,676,195 B1 * | 1/2004 | Marriott et al. | .......... | 296/146.7 |
| 6,712,179 B1 * | 3/2004 | Bouyonnet | ................... | 181/290 |
| 6,767,049 B1 * | 7/2004 | Morrison et al. | ........ | 296/146.7 |
| 6,814,382 B1 * | 11/2004 | Kohara et al. | ............. | 296/39.3 |
| 6,820,922 B1 * | 11/2004 | Staus et al. | ................. | 296/154 |
| 6,890,018 B1 * | 5/2005 | Koa et al. | ................. | 296/146.5 |

* cited by examiner

*Primary Examiner*—Kiran B. Patel
(74) *Attorney, Agent, or Firm*—Flynn, Thiel, Boutell & Tanis, P.C.

(57) ABSTRACT

There is provided a door structure of an automobile, capable of being visually checked as to whether or not a peripheral edge of an opaque water.noise isolation sheet is reliably bonded to a door inner panel through the intermediary of a sealer (adhesive). With the door structure, the door inner panel of the automobile is provided with the opaque water-.noise isolation sheet for ensuring watertightness and noise isolation after stopping up at least access holes of the door inner panel, and the inner peripheral edge of a transparent film substantially annular in shape is fixedly attached to the outer peripheral edge of the opaque water.noise isolation sheet, thereby forming a structure wherein the outer peripheral edge of the transparent film is bonded to the door inner panel through the intermediary of the sealer (adhesive).

4 Claims, 5 Drawing Sheets

AUTOMOBILE DOOR STRUCTURE WITH WATER AND NOISE ISOLATION SHEET

FIELD OF THE INVENTION

The present invention relates to an automobile door structure with a sheet having watertightness and noise isolation, which is hereinafter referred to as a "water-noise isolation sheet", installed on the interior side of a door inner panel.

BACKGROUND OF THE INVENTION

Referring to FIGS. 1 to 3, description is given hereinafter. Traditionally, a polyethylene sheet called a hole-seal or a service-hole cover (hereinafter referred to merely as a hole-seal) is attached to a door inner panel 1 of an automobile through the intermediary of a sealer (adhesive) 6 in order to ensure watertightness by stopping up access holes 1a formed in the door inner panel 1. The hole-seal is provided to prevent rainwater, and so forth, from making ingress between a door glass 3 and a door outer panel 2 to thereby enter the interior of the automobile through the access holes 1a.

Further, it has lately been proposed to install a water-noise isolation sheet 4 of a low specific gravity in place of the hole-seal in order to provide noise isolation in addition to watertightness. However, when the peripheral edge of the water-noise isolation sheet 4 is fixed to the door inner panel 1 through the intermediary of the sealer 6 as with the case of the conventional hole-seal, it is not possible to visually recognize the sealer 6 through the peripheral edge of the water-noise isolation sheet 4 because the water-noise isolation sheet 4 is opaque. As a result, a problem arises in that it is not possible to check whether or not the water-noise isolation sheet 4 is accurately bonded to the door inner panel 1 through the intermediary of the sealer 6.

Unless the peripheral edge of the water-noise isolation sheet 4 is reliably bonded to the door inner panel 1 through the intermediary of the sealer 6, there arises a problem that leakage of water and noise occurs, resulting in deterioration of functions of both watertightness and noise isolation.

SUMMARY OF THE INVENTION

The invention has been developed in view of the problems described in the foregoing, and it is therefore an object of the invention to provide a door structure of an automobile, capable of being visually checked as to whether or not the peripheral edge of an opaque water-noise isolation sheet is reliably bonded to a door inner panel through the intermediary of a sealer.

The door structure of an automobile is now described with reference to FIG. 1 and FIGS. 4 to 10.

The door stricture of an automobile according to the first aspect invention includes a door inner panel 1 of the automobile provided with an opaque water-noise isolation sheet 4 for ensuring watertightness and noise isolation by stopping up at least access holes 1a of the door inner panel 1. The door structure further includes a transparent film 5, wherein an inner peripheral edge of the transparent film 5 substantially annular in shape is fixedly attached to an outer peripheral edge of the opaque water-noise isolation sheet 4, thereby forming a structure wherein the outer peripheral edge of the transparent film 5 is bonded to the door inner panel 1 through the intermediary of a sealer 6. The transparent film 5 includes a semitransparent film.

The door structure of an automobile according to the second aspect invention includes a door inner panel 1 of the automobile provided with an opaque water-noise isolation sheet 4 for ensuring watertightness and noise isolation by stopping up at least access holes 1a of the door inner panel 1. The door structure further includes a slit 4a with a predetermined width formed in portions of the water-noise isolation sheet 4, opposite to the respective peripheries of the access holes 1a, on four sides thereof, and a transparent film 5, wherein edges of each of transparent films 5, at least on both sides along the longitudinal direction thereof, are fixedly attached to the water-noise isolation sheet 4 in such a way as to stop up the respective slits 4a, and respective central parts of portions of the transparent films 5, opposite to the respective slits 4a, are bonded to the door inner panel 1 through the intermediary of the seller 6.

The door structure of an automobile according to the third aspect invention includes a door inner panel 1 of the automobile provided with an opaque water-noise isolation sheet 4 for ensuring watertightness and noise isolation by stopping up at least access holes 1a of the door inner panel 1. The opaque water-noise isolation sheet 4 has a collision absorption pad 9 against which a door interior trim material 10 is butted at a time of assembling. The door structure further includes a transparent film 5, wherein an inner peripheral edge of the transparent film 5 substantially annular in shape is fixedly attached to an outer peripheral edge of the opaque water-noise isolation sheet 4, thereby forming a structure wherein the outer peripheral edge of the transparent film 5 is bonded to the door inner panel 1 through the intermediary of a sealer 6. The door structure further includes a looseness 4b provided at least by the periphery of the collision absorption pad 9 of the water-noise isolation sheet 4, and a portion of the transparent film 5, by the periphery of the collision absorption pad 9, is set larger in width than other portion thereof to form a wider part 5a, and a part of the wider part 5a, on the inner side of the sealer 6, is fixed to the door inner panel 1 with alignment clips 7.

With the door structure of an automobile according to the fourth aspect invention, fixed attachment between the transparent film 5 and the opaque water-noise isolation sheet 4 according to the first to third aspects of the invention is effected by a thermal welding or with an adhesive.

In accordance with the first aspect of the present invention, the inner peripheral edge of a transparent film 5 substantially annular in shape is fixedly attached to the outer peripheral edge of the opaque water-noise isolation sheet 4, and the outer peripheral edge of the transparent film 5 is bonded to the door inner panel 1 through the intermediary of a sealer 6, so that the sealer 6 can be visually recognized through the transparent film 5. Accordingly, it is possible to easily check whether or not the water-noise isolation sheet 4 is bonded to the door inner panel 1 by the sealer 6 through the intermediary of the transparent film 5. As a result, a door structure excellent in watertightness and noise isolation can be provided.

In accordance with the second aspect of the present invention, a slit 4a with a predetermined width is formed in portions of the water-noise isolation sheet 4, opposite to the respective peripheries of the access holes 1a, on four sides thereof, and the edges of each of transparent films 5, at least on both sides along the longitudinal direction thereof, are fixedly attached to the water-noise isolation sheet 4 in such a way as to stop up the respective slits 4a. Further, the respective central parts of portions of the transparent films 5, opposite to the respective slits 4a, are bonded to the door inner panel 1 through the intermediary of the sealer 6. Accordingly, the sealer 6 can be visually recognized through the transparent film 5.

It is therefore possible to visually check with ease whether or not the water-noise isolation sheet 4 is bonded to the door inner panel 1, on the respective peripheries of the access holes 1a, with reliability. As a result, it is possible to prevent with reliability occurrence of an event where rainwater, and so forth entering between a door glass 3 and a door outer panel 2 reaches the interior of an automobile after passing through the respective access holes 1a. Furthermore, propagation of noise also can be effectively prevented. Thus, a door structure excellent in watertightness and noise isolation can be provided.

Further, in accordance with the third aspect of the present invention, the inner peripheral edge of a transparent film 5 substantially annular in shape is fixedly attached to the outer peripheral edge of the opaque water-noise isolation sheet 4, and the outer peripheral edge of the transparent film 5 is bonded to the door inner panel 1 through the intermediary of a sealer 6, so that the sealer 6 can be visually recognized through the transparent film 5. Accordingly, it is possible to check whether or not the water-noise isolation sheet 4 is bonded to the door inner panel 1 with reliability. As a result, a door structure excellent in watertightness and noise isolation can be provided.

Further, because looseness 4b is provided at least by the periphery of a collision absorption pad 9 of the water-noise isolation sheet 4, even if a door interior trim material 10 is butted against the collision absorption pad 9 at a time of assembling, an event where the sealer 6 is broken can be prevented by the agency of the looseness 4b. Accordingly, it is possible to preemptively prevent an event where the opaque water-noise isolation sheet 4 is peeled off from the door inner panel 1. Thus, a door structure excellent in watertightness and noise isolation can be provided.

In addition, a portion of the transparent film 5, by the periphery of the collision absorption pad 9, is set larger in width than other portion thereof to form a wider part 5a, and a part of the wider part 5a, on the inner side of the sealer 6, is fixed to the door inner panel 1 with alignment clips 7, so that it is possible to accurately set a suitable loosened value for the looseness 4b. Accordingly, breakage of the sealer 6 can be prevented with greater reliability. Furthermore, by the agency of the alignment clips 7, tensile stress acting on the sealer 6 can be reduced, so that breakage of the sealer 6 can be prevented with still greater reliability.

Still further, in accordance with the fourth aspect of the present invention, the transparent film 5 may be fixedly attached to the opaque water-noise isolation sheet 4 by thermal welding or with adhesive, so that both in their entireties can be closely assembled together in contrast to the case of assembling with clips or the like. As a result, the watertightness and noise isolation by virtue of the water-noise isolation sheet 4 can be further enhanced.

DETAILED DESCRPTION OF THE PREFERRED EMBODIMENTS

Figure 1:
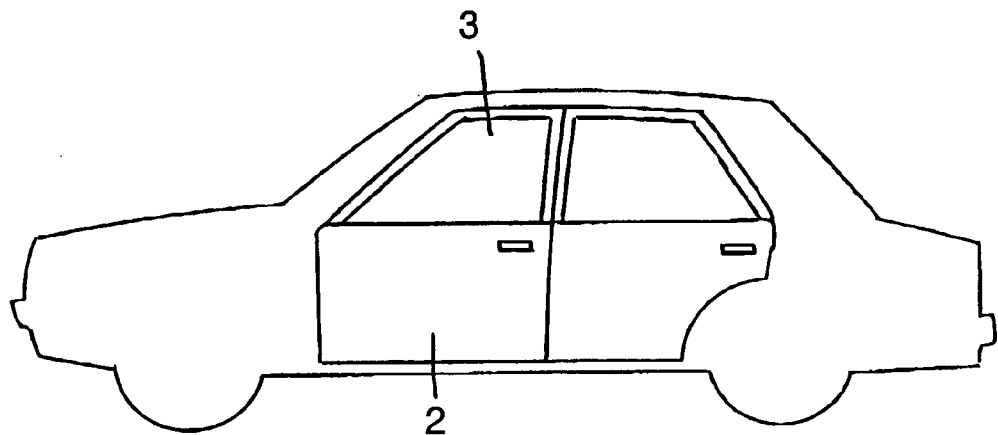
FIG. 1 is a side view of an automobile having a door structure provide with a water-noise isolation sheet.
Figure 2:
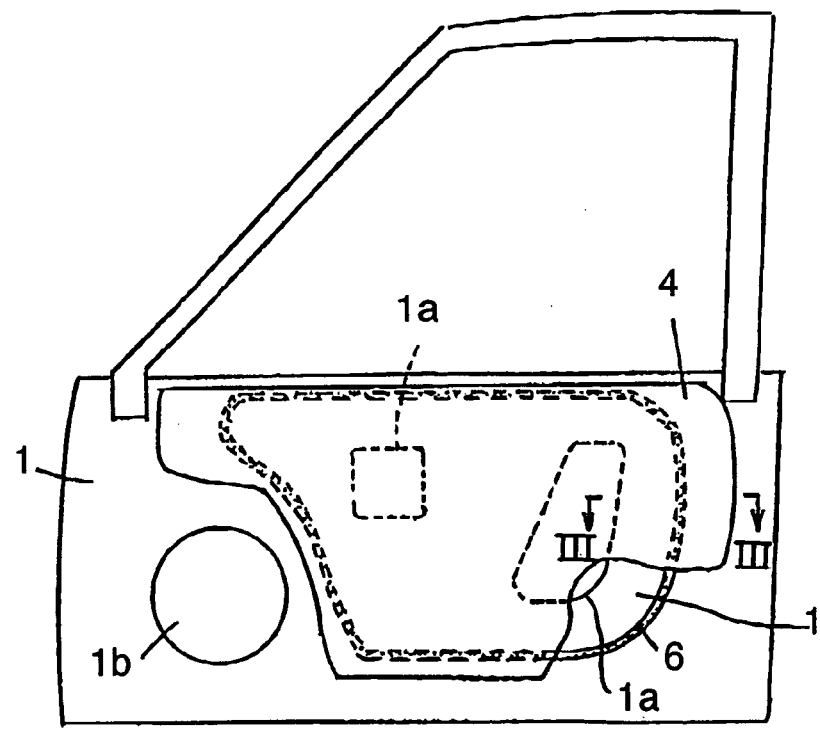
FIG. 2 is a side view showing the interior side of a conventional door structure.
Figure 3:
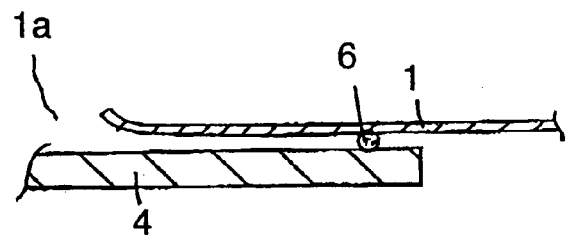
FIG. 3 is a sectional view taken on line III—III in FIG. 2.
Figure 4:
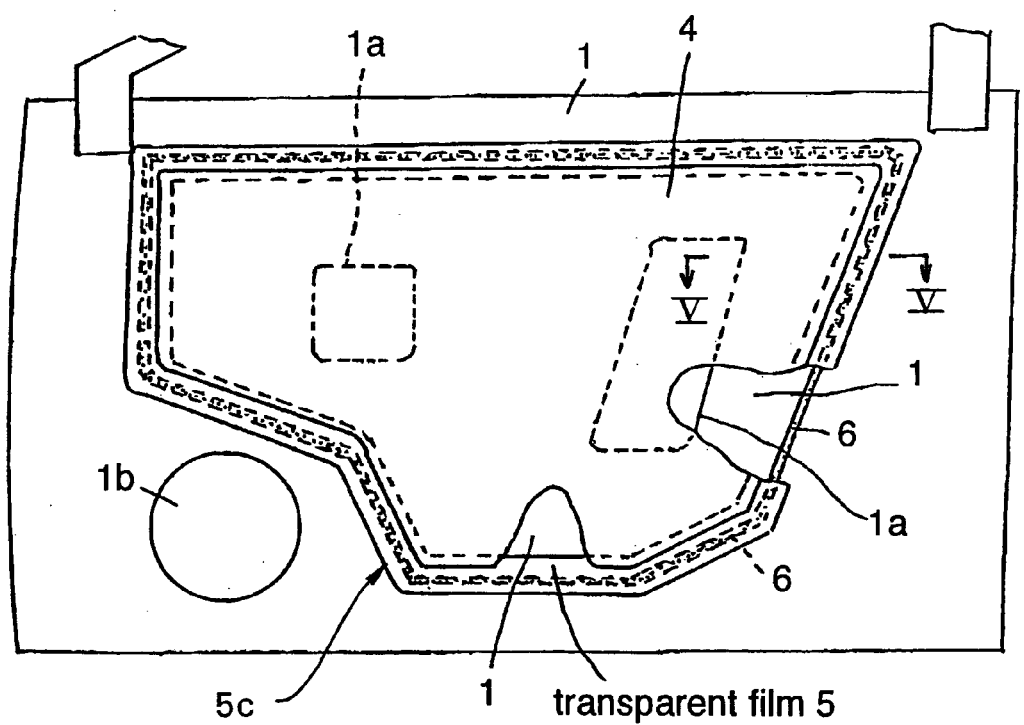
FIG. 4 is a side view showing the interior side of a door structure according to a first embodiment of the invention.
Figure 5:
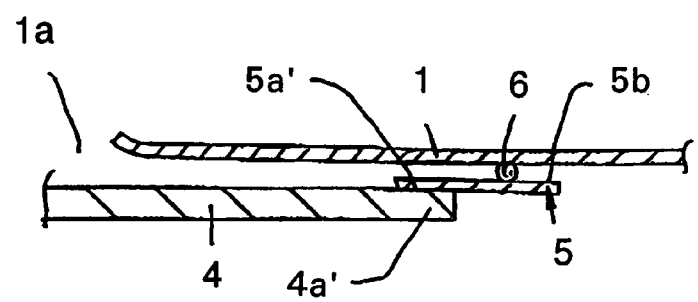
FIG. 5 is a sectional view taken on line V—V in FIG. 4.

A first embodiment of a door structure with a water-noise isolation sheet according to the invention is shown in FIG. 1, and FIGS. 4 and 5. This is the door structure wherein a door inner panel 1 of in automobile is provided with an opaque water-noise isolation sheet 4 for ensuring watertightness and noise isolation by stopping up access holes 1a of the door inner panel 1. The door structure is characterized in that the inner peripheral edge 5a' of a transparent film 5 substantially annular in shape is fixedly attached to the outer peripheral edge 4a' of the opaque water-noise isolation sheet 4 by thermal welding, and the outer peripheral edge 5b of the transparent film 5 is bonded to the door inner panel 1 through the intermediary of a sealer (adhesive) 6. By so doing, the sealer 6 can be visually recognized through the transparent film 5, so that it is possible to easily check whether or not the outer peripheral edge 4a' of the water-noise isolation sheet 4 (now provided with a transparent area 5c defined by film 5) is bonded to the door inner panel 1 through the intermediary of the transparent film 5 and the sealer 6. By conducting such checking, it becomes possible to provide the door structure excellent in watertightness and noise isolation.

Figure 6:
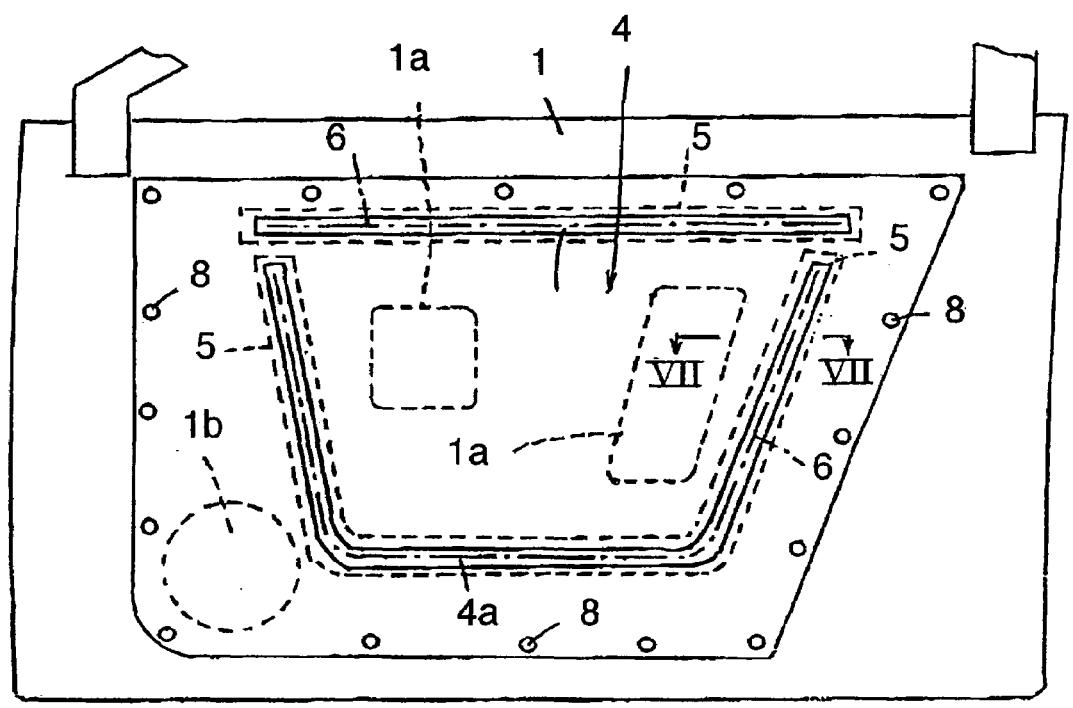
FIG. 6 is a side view showing the interior side of a door structure according to a second embodiment of the invention.
Figure 7:
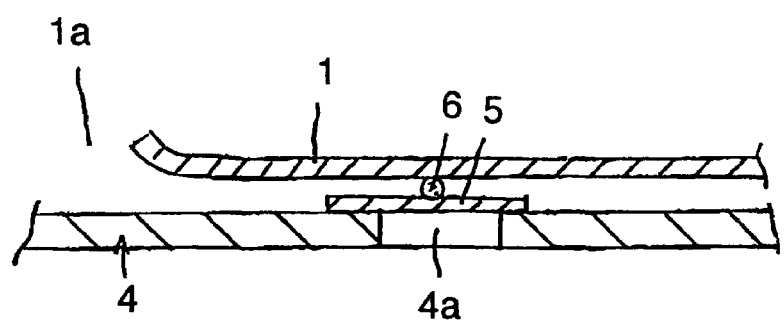
FIG. 7 is a sectional view taken on line VII—VII in FIG. 6.
Figure 8:
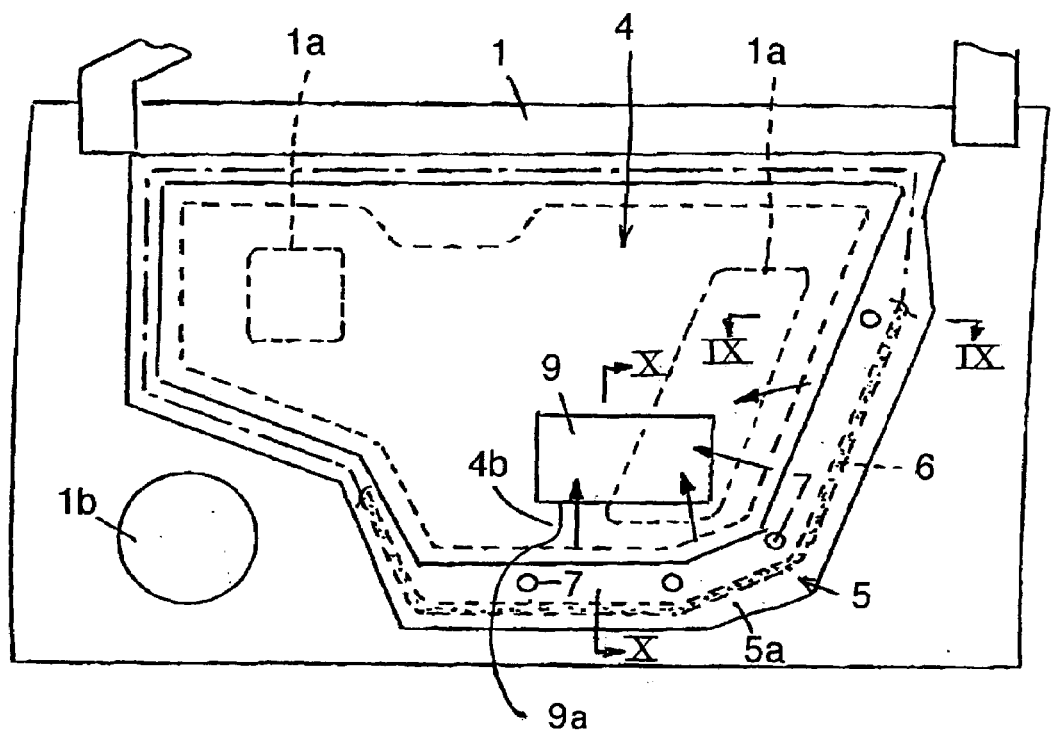
FIG. 8 is a side view showing the interior side of a door structure according to a third embodiment of the invention.
Figure 9:
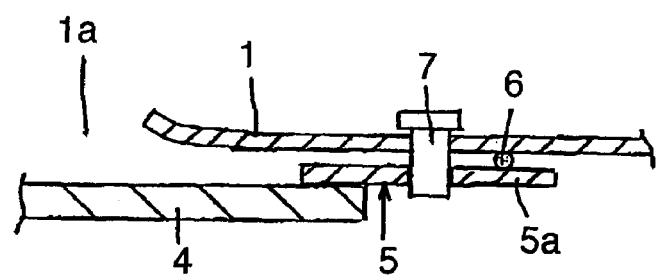
FIG. 9 is a sectional view taken on line IX—IX in FIG. 8.

A second embodiment of a door structure with a water-noise isolation sheet according to the invention is shown in FIG. 1, and FIGS. 6 and 7. This is the door structure wherein a door inner panel 1 of an automobile is provided with an opaque water-noise isolation sheet 4 for ensuring watertightness and noise isolation by stopping up both access holes 1a and a speaker hole 1b or the door inner panel 1. With the door structure, a slit 4a with a predetermined width is formed in portions of the water-noise isolation sheet 4, opposite to the respective peripheries of the access holes 1a, on four sides thereof, and the edges of each of transparent films 5, on both sides along the vertical and horizontal (longitudinal) directions thereof, are fixedly attached to the water-noise isolation sheet 4 in such a way as to stop up the respective slits 4a. Further, the respective central parts of portions of the transparent films 5, opposite to the respective slits 4a, are bonded to the door inner panel 1 through the intermediary of the sealer 6.

With the present embodiment, on the respective peripheries of the access holes 1a, on the four sides thereof, the water-noise isolation sheet 4 is bonded to the door inner panel through the intermediary of the sealer 6, thereby stopping up the access holes 1a with reliability. Accordingly, it is possible to prevent with reliability occurrence of an event where rainwater, and so forth entering between a door glass 3 and a door outer panel 2 reaches the interior of an automobile after passing through the respective access holes 1a. Furthermore, propagation of noise also can be effectively prevented. Thus, the door structure excellent in watertightness and noise isolation can be provided. With the present embodiment, further, the outer peripheral edge of the water-noise isolation sheet 4, together with a door interior trim material 10, is fixed to the door inner panel 1 with fixture clips 8.

A third embodiment of a door structure with a water-noise isolation sheet according to the invention is shown in FIG. 1, and FIGS. 8 to 10. This is the door structure wherein a door inner panel 1 of an automobile is provided with an opaque water-noise isolation sheet 4 for ensuring watertightness and noise isolation by stopping up access holes 1a of the door inner panel 1. A collision absorption pad 9 against which a door interior trim material 10 is butted at a time of assembling is attached to the water-noise isolation sheet 4.

Further, the inner peripheral edge of a transparent film 5 substantially annular in shape is fixedly attached to the outer peripheral edge of the opaque water-noise isolation sheet 4 with an adhesive, and the outer peripheral edge of the transparent film 5 is bonded to the door inner panel 1 through the intermediary of the sealer 6. By so doing, the sealer 6 can be visually recognized through the transparent film 5, so that it is possible to easily check whether or not the water-noise isolation sheet 4 is bonded to the door inner panel 1 with reliability.

Figure 10:
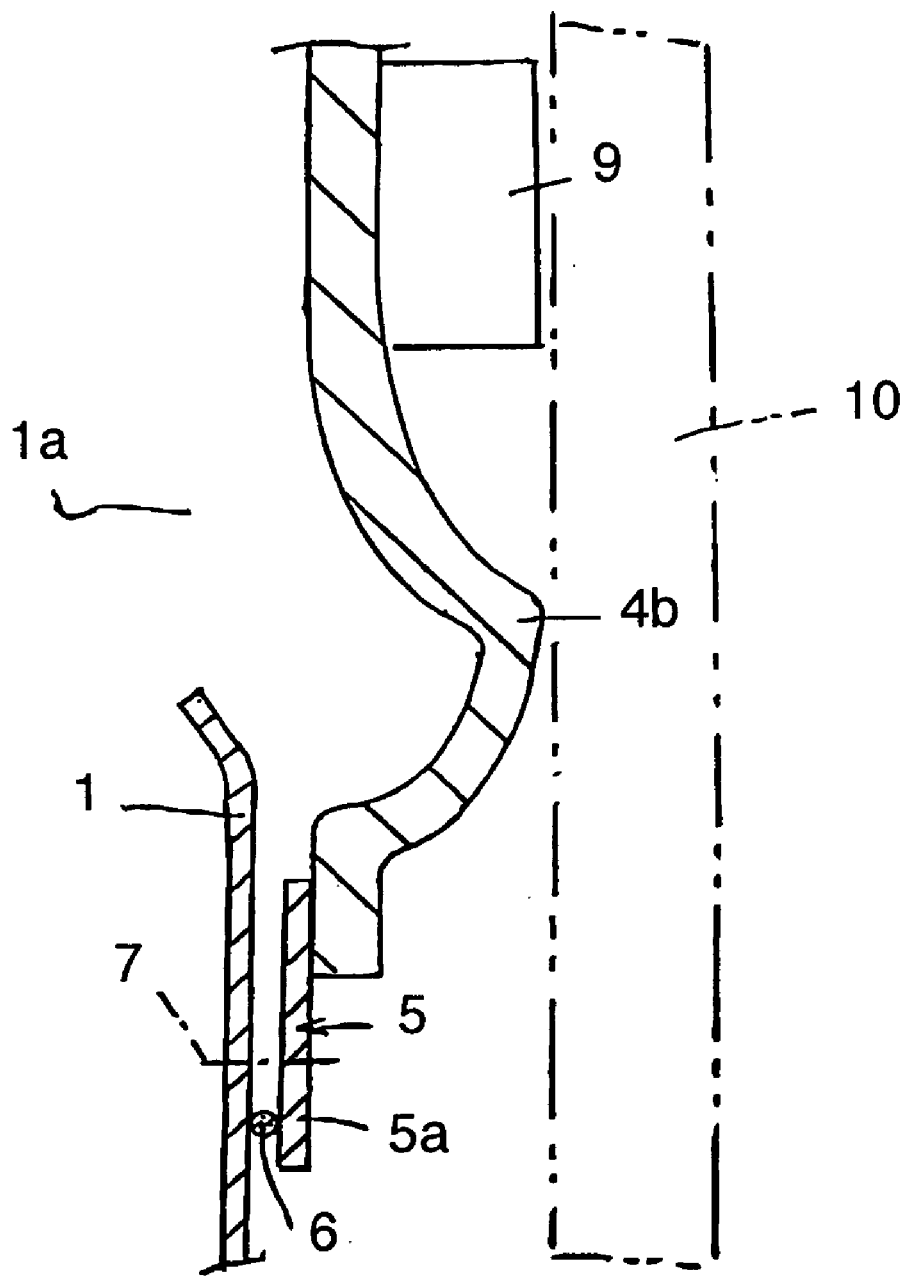
FIG. 10 is a sectional view taken on line X—X in FIG. 8.

Furthermore, looseness 4b is provided by the periphery (the underside of the water-noise isolation sheet 4, on the right hand side, in the case of the present embodiment, in FIG. 10) of the portion of the collision absorption pad 9 of the water-noise isolation sheet 4. As a result, even if the door interior trim material 10 is butted against the collision absorption pad 9 at the time of assembling, and the sealer 6 is pulled in the direction indicated by arrows in FIG. 8, an event where the sealer 6 is broken can be prevented by the agency of the looseness 4b.

In addition, with the door structure, portions of the transparent film 5, by the periphery 9a of the collision absorption pad 9, are set larger in width than other portions thereof, thereby forming a wider part 5a, and parts of the wider part 5a, on the inner side of the sealer 6, are fixed to the door inner panel 1 with alignment clips 7, respectively. By so doing, it is possible to accurately set a suitable loosened value for the looseness 4b and also to prevent breakage of the sealer 6 with greater reliability.

The disclosure of Japanese Patent Application No. 2003-317894 field Sep. 10, 2003 including specification, claims, and drawings, is incorporated herein by reference.

What is claimed is:

1. A door structure of an automobile comprising an inner door panel defining therein at least one access hole, an opaque water/noise isolation sheet provided on said inner door panel for ensuring water-tightness and noise isolation by being mounted on said inner door panel so as to close off said access hole, and a transparent film defining an inner peripheral edge of a substantially annular shape and fixedly attached to an outer peripheral edge of said isolation sheet and an outer peripheral edge bonded to said door panel.

2. The door structure of claim 1, wherein said outer peripheral edge of said film is adhesively bonded to said door panel.

3. The door structure of claim 1, wherein said film is annular in shape and is disposed in surrounding relation with said outer peripheral edge of said isolation sheet and provides said isolation sheet with a transparent area to allow visual inspection of the mounting of said isolation sheet on said door panel.

4. The door structure of claim 1, further including a collision absorption pad mounted on said isolation sheet inwardly of said outer peripheral edge thereof, said isolation sheet including an excess of material disposed adjacent an outer periphery of said absorption pad, said excess of material preventing breaking of the bond between said outer peripheral edge of said film and said door panel upon butting of said collision pad with a door inner trim material during assembly.

* * * * *